July 7, 1925.
W. P. HAMMOND ET AL
FARE CALCULATOR AND REGISTER
Filed Nov. 4, 1919 5 Sheets-Sheet 1
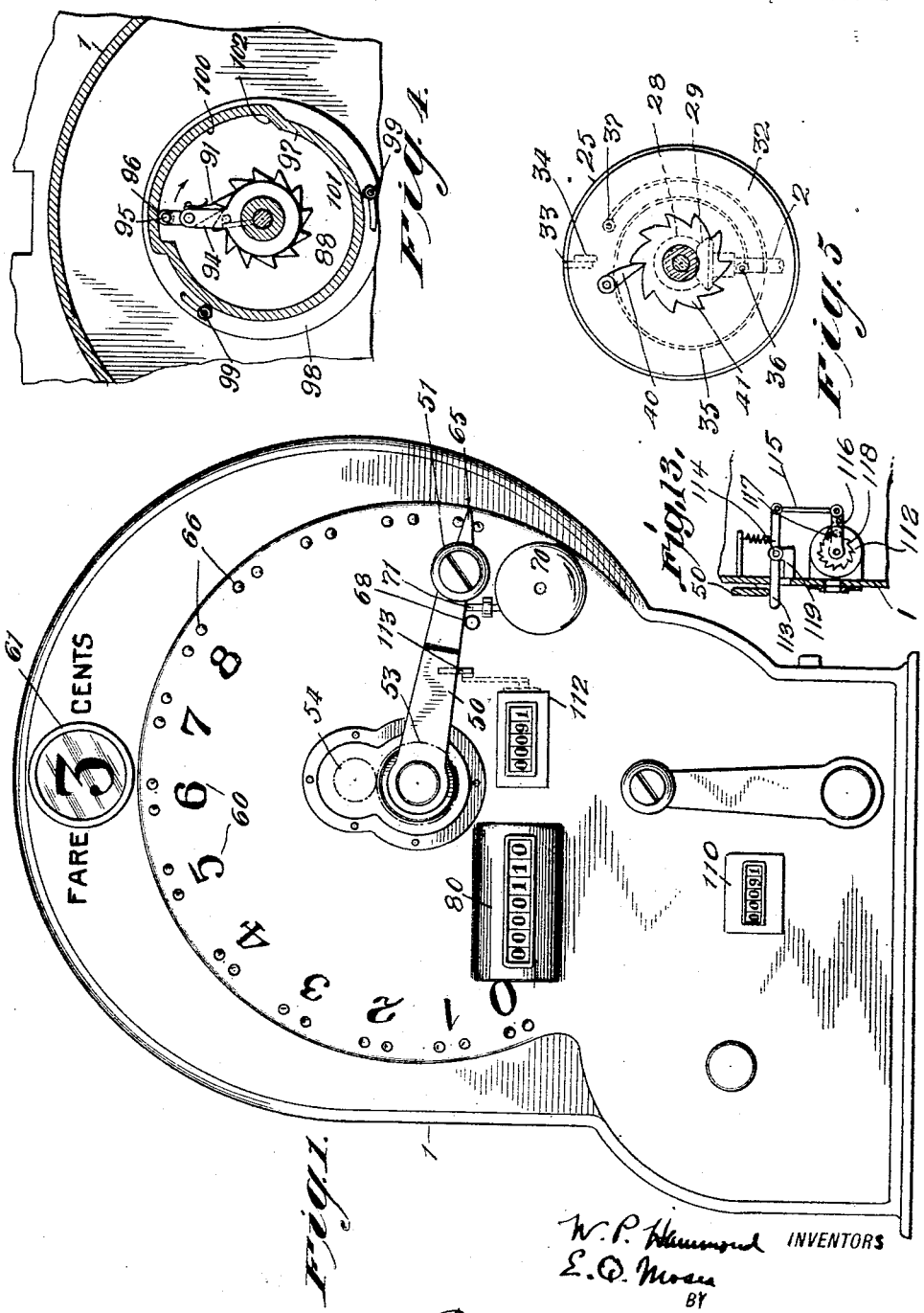

July 7, 1925.
W. P. HAMMOND ET AL
1,545,254
FARE CALCULATOR AND REGISTER
Filed Nov. 4, 1919
5 Sheets-Sheet 2
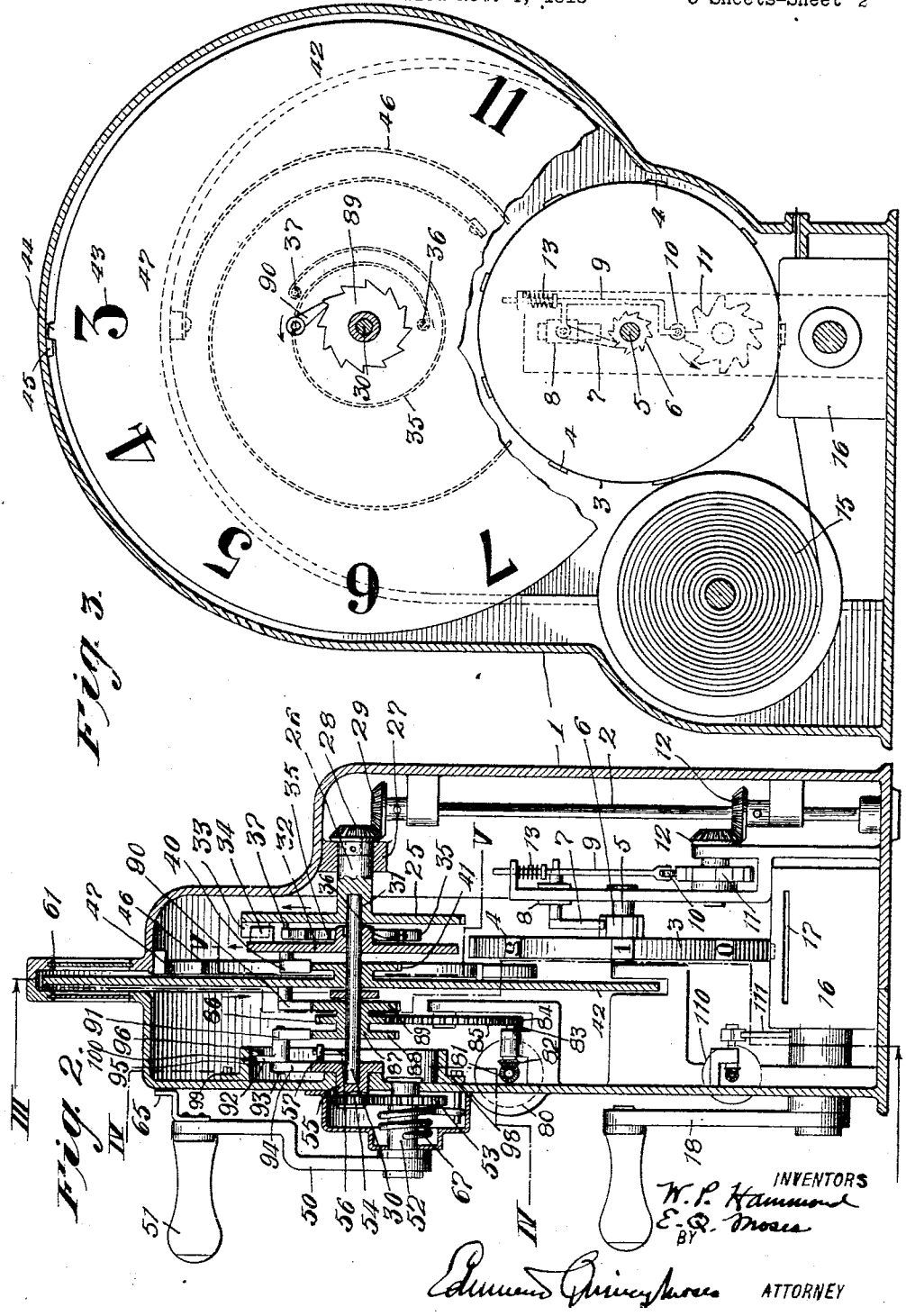
INVENTORS
W. P. Hammond
E. Q. Moses
BY
Edmund Quincy Moses ATTORNEY July 7, 1925.
W. P. HAMMOND ET AL
1,545,254
FARE CALCULATOR AND REGISTER
Filed Nov. 4, 1919     5 Sheets-Sheet 3
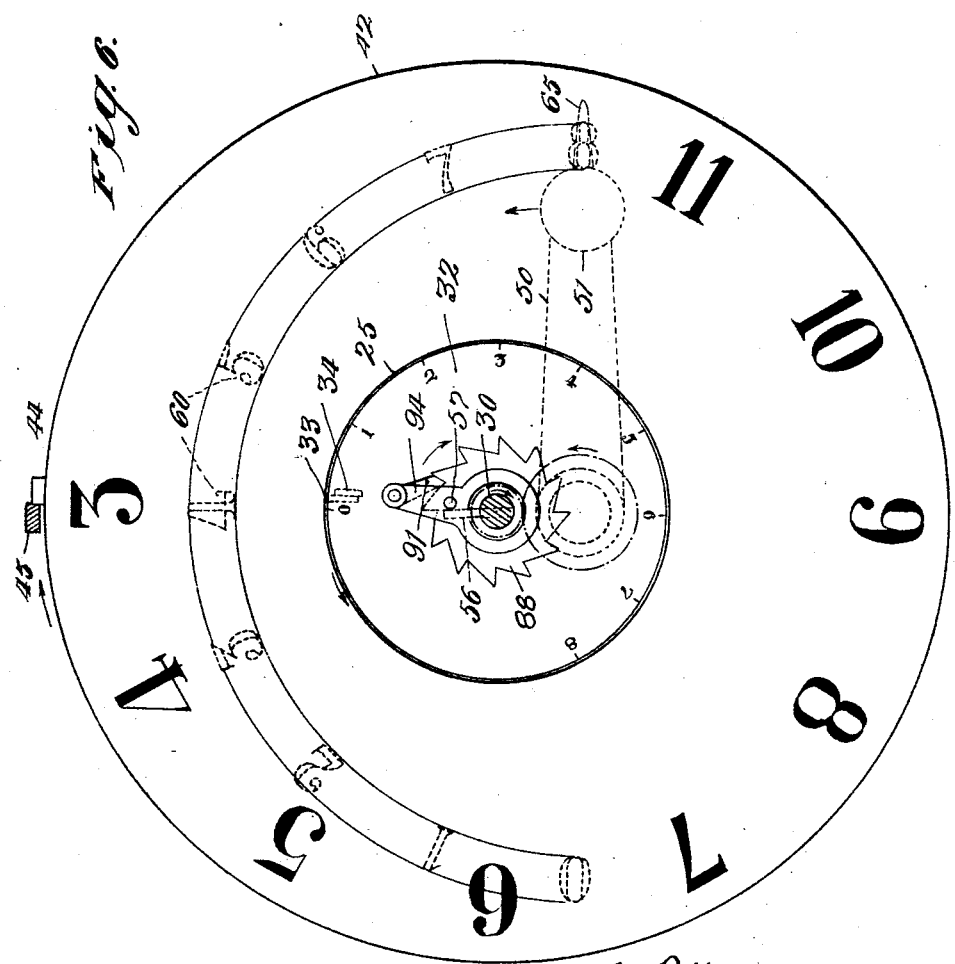
INVENTORS
BY
ATTORNEY

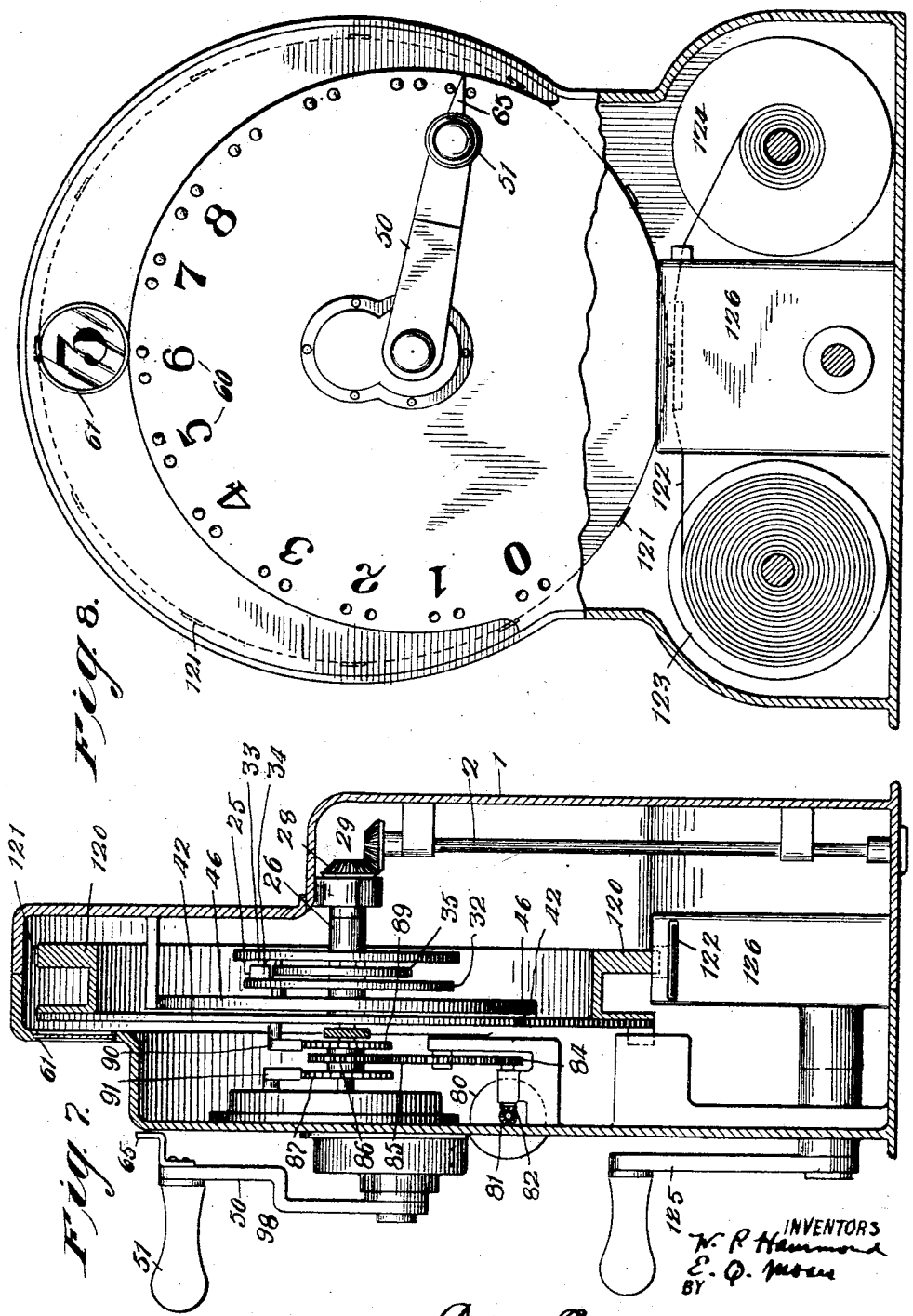

July 7, 1925.
W. P. HAMMOND ET AL
1,545,254
FARE CALCULATOR AND REGISTER
Filed Nov. 4, 1919 5 Sheets-Sheet 5
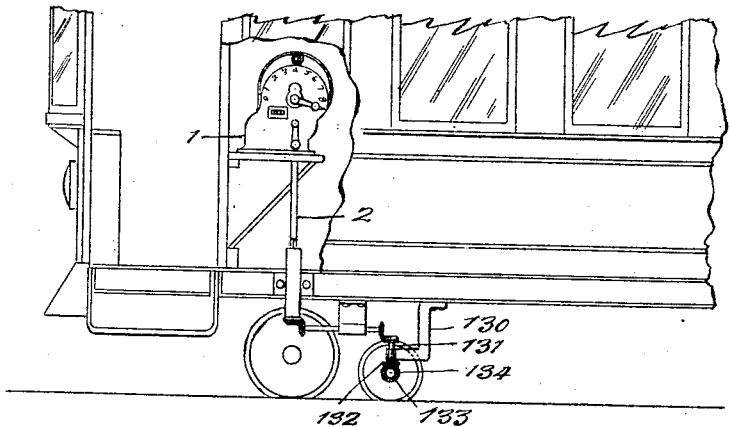
Fig. 9.
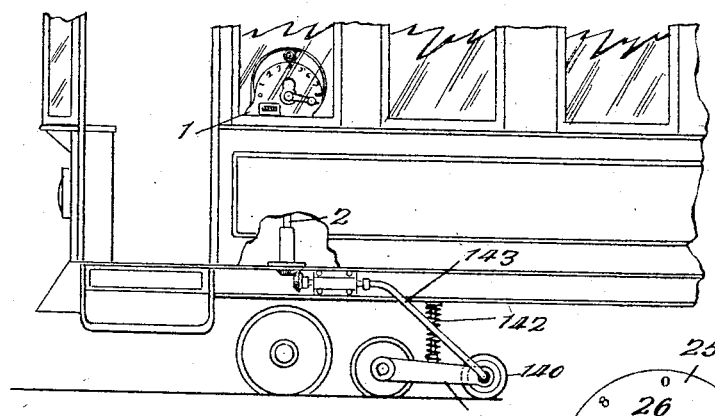
Fig. 10.
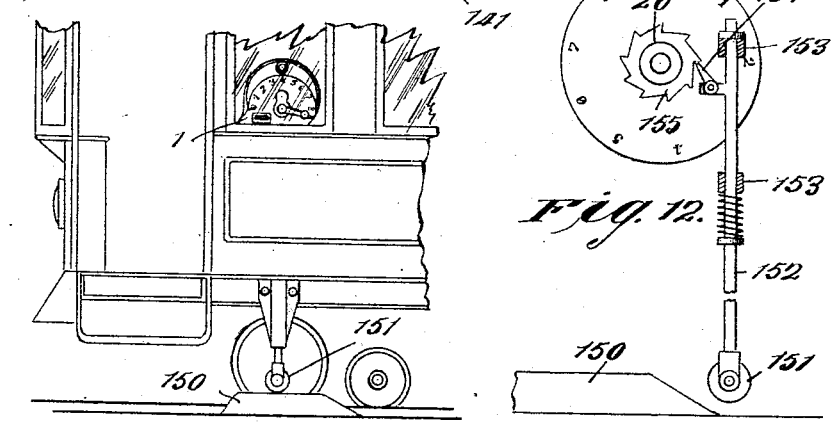
Fig. 11.
Fig. 12.
W. P. Hammond
E. Q. Moses
INVENTORS
BY
Edmund Quincy Moses ATTORNEY

Patented July 7, 1925.

1,545,254

UNITED STATES PATENT OFFICE.

WILLIAM P. HAMMOND, OF PASSAIC, NEW JERSEY, AND EDMUND QUINCY MOSES, OF NEW YORK, N. Y.

FARE CALCULATOR AND REGISTER.

Application filed November 4, 1919. Serial No. 335,578.

*To all whom it may concern:*

Be it known that we, WILLIAM P. HAMMOND and EDMUND QUINCY MOSES, citizens of the United States, and residents, respectively, of Passaic, New Jersey, and New York, New York, have invented certain new and useful Improvements in Fare Calculators and Registers, of which the following is a specification.

This invention relates to calculating, indicating and registering mechanism adapted to be controlled in accordance with the changes in a variable factor, so that when actuated by the operator it will automatically calculate and indicate or register a sum of money to be paid or other desired quantity, depending upon the value of the variable factor at the time of actuation, and the value of some other factor known to the operator at the time of actuation, and which the operator uses to determine the character of actuation. The invention finds a special field of usefulness in connection with the calculation, indication and registration of fares to be collected from passengers riding on street cars, omnibuses or other public conveyances, but is not limited to such use and may be employed wherever the invention is found applicable.

To refer particularly to the utility of the invention as a fare collector, it is obvious that the equitable basis of fixing fares consists in charging each passenger a fare based upon the distance traveled by him. In street conveyances, however, which take on and discharge passengers at any point along the route, difficulty would be experienced in determining by ordinary methods the amount to be collected from each passenger. Attempts to overcome this difficulty to a more or less extent have been made by applying the principle of zone fares, the route of the vehicle being divided up into a small number of definite geographical zones, the passenger being charged a certain fare for each zone passed through. The simplest application of this principle consists in having the conductor collect the fare for each zone from each passenger on the vehicle at the time the zone point is passed. This is objectionable as requiring repeated collections of fare from a passenger traveling through a number of zones. Another method consists in giving the passenger a ticket and collecting the fare in advance for the number of zones which the passenger designates that he desires to travel through. This method requires the conductor to be on the watch to see that a passenger does not go beyond the point for which he has paid fare. Another method consists in giving the passenger a ticket indicating the point at which he gets on the car and then collecting the fare from him when he gets off for the number of zones through which he has traveled. According to this method, as now practiced, the conductor determines from the position of the vehicle at the time the passenger gets on how the ticket issued to him shall be marked, and again is required to determine the position of the car when the passenger gets off and to make a calculation of the number of zones passed through and the fare to be collected. This requires care and attention on the part of the conductor and a considerable expenditure of time, which causes delays when many passengers are getting on and off. There is also the danger of mistakes being made in calculating the fare. This system is only applicable where there are but a small number of zones which must ordinarily be of considerable extent and it has not worked out satisfactorily even under such favorable conditions.

The present invention provides an apparatus by which the distance traveled by any particular passenger may be kept track of accurately and substantially automatically, and by which the fare to be paid by such passenger is automatically and instaneously calculated, indicated and registered so that no time is lost in handling the passengers, there is no chance of mistake or dishonesty on the part of the conductor, and the passenger is clearly informed by the indicating means of the machine just what fare is due from him. The invention also makes it possible to adopt a unit of fare collection as small as may be desired so that each passenger is virtually required to pay only for the distance which he actually travels.

The nature and specific objects of the invention will best be understood from a description of a preferred form of apparatus embodying the invention which we have chosen to illustrate the principle thereof and the best mode now known to us for performing the same.

In the accompanying drawings which form a part of this specification, and which illustrate such preferred apparatus, Figure 1 is a front view of a combined ticket-issuing and fare computing, indicating and registering mechanism;

Figure 2 is a vertical transverse section of the apparatus shown in Figure 1;

Figure 3 is a longitudinal vertical sectional view of the apparatus taken on line III—III of Figure 2;

Figure 4 is a detail sectional view taken on line IV—IV of Figure 2;

Figure 5 is a similar view taken on line V—V of Figure 2;

Figure 6 is a diagrammatic view showing the indicator dial and certain other parts, and illustrating the principle of operation of the device;

Figure 7 is a transverse sectional view of a modified form of instrument;

Figure 8 is a front view of such form, part of the casing of the instrument being broken away;

Figures 9, 10 and 11 are diagrammatic views illustrative of modes which may be employed for driving the apparatus in accordance with the movements of the vehicle, Figure 12 is a diagrammatic view illustrating the operative mechanism utilized in connection with the drive shown in Figure 11 and Figure 13 is a detailed view of conventional means for operating the counter which indicates the number of operations of the indicating and registering lever, and which may also be used for operating the counter which indicates the number of operations of the lever for marking the tickets.

Referring particularly to the apparatus shown in Figures 1 to 6, this apparatus includes both means for issuing marked or numbered tickets, and means for calculating, indicating and registering the fares to be collected. These two mechanisms, however, are not necessarily combined in a single apparatus, as the ticket issuing may be performed by separate devices, or the tickets may be given out by hand. In the particular apparatus illustrated, there is mounted within a suitable casing 1 the driving shaft 2 which is actuated in accordance with the variations in the variable factor of the calculation. Where the device is used as a fare calculator, the shaft 2 is driven in accordance with the travel of the vehicle, either by being connected to one of the wheels of the vehicle or by the action of fixed stops placed at intervals, or otherwise, as will be more particularly described hereinafter. In some cases this part of the apparatus might be operated manually at stated intervals or by time-controlled mechanism or the like. In the apparatus shown the shaft 2 controls both the ticket issuing and the calculating, indicating and registering mechanisms. The ticket issuing mechanism includes a printing wheel 3 having types 4 thereon, and mounted to rotate on an arbor 5. Fixed to the side of the printing wheel is a ratchet 6 having a number of teeth equal to the number of types on the printing wheel. This ratchet is engaged by a pawl 7 pivoted to a slide 8 which is adapted to be moved up and down by a frame 9 carrying at its lower end a cam follower 10, which is adapted to be actuated by the teeth of a cam 11, the latter being driven by bevel gearing 12 from the shaft 2. Each time a tooth of the cam 11 passes under the cam follower 10 it raises such follower and the slide 8 and pawl 7, thereby enabling the pawl to engage another tooth on the ratchet 6. As soon as a tooth on the cam 11 passes the cam follower the latter is forced downwardly by a spring 13, and the pawl 7 is caused to push the ratchet around the distance of one tooth, thereby bringing another type on the printing wheel 3 into active position. The position of the printing wheel is thus determined by the rotation of the driving shaft 2. Any suitable means may be provided for preventing overthrow of the type wheel and its ratchet and alining the type with the platen. These devices, being old and well known in the art, have not been illustrated. Suitable devices are provided for causing an impression to be made on a ticket by the type when the printing wheel is in operative position and for delivering the ticket thus printed. In the construction shown a roll of ticket tape 15 is used, and there are means for pressing the tape against the type, for cutting off the ticket when printed, and for delivering the ticket, contained within a casing 16, the ticket being delivered through a slot 17. A crank 18 is provided which, every time it is turned, operates the mechanism to print and deliver a ticket. The impressing, ticket feeding and cutting off devices will not be illustrated and described in detail, as devices for this purpose are well known in the art of cash registers and similar mechanisms, and any suitable apparatus of this character may be employed. As the position of the printing wheel 3 is controlled by the position of the vehicle, it will be seen that every time the operator turns the crank 18 a ticket will be delivered bearing a number corresponding with the position of the vehicle at the time of operation. Such a ticket is given to each passenger as he gets on the vehicle so that each passenger is thus provided with identifying means showing the position of the car at the time he got on; that is to say, the distance which the car had traveled from the beginning of the route.

Considering now the second and more vital part of the apparatus illustrated, namely the fare calculating, indicating and registering mechanism, this also has an element driven from the driving shaft 2 in accordance with the travel of the vehicle. As illustrated, this element comprises the distance wheel 25 which has a stem or journal 26 mounted to rotate in a bearing 27 fixed in the casing and which stem carries at its outer end a bevel gear 28 meshing with the bevel gear 29 fixed to the upper end of the shaft 2. Mounted concentrically with the axis of rotation of the distance wheel 25 is an arbor 30, one end of which may conveniently be supported in a socket 31 in the wheel 25 and its stem, but free to rotate in such socket. Mounted on the arbor and fixed to turn therewith is a follower disc 32. The distance wheel 25 is provided with a stop 33 which is adapted to be normally engaged by a stop 34 on the follower disc, and yielding connection is established between the distance wheel and the follower disc by means of a spiral spring 35, one end of which is fixed to the hub of the follower disc at the point 36 and the other end of which is fixed to a pin 37 on the distance wheel. Spring 35 draws the follower disc 32 along with distance wheel 25, keeping stop 34 in contact with stop 33. The follower 32, however, may be reversely rotated independently of the distance wheel 25 in the manner to be hereinafter described, this movement tensioning the spring 35, which tends to restore the follower disc to a position in which stop 33 is in contact with stop 34. The follower disc has pivoted to its face a pawl 40 (Figures 2 and 5), which engages a ratchet 41 fixed to a large disc 42 provided with indicating numerals 43 and which may be termed the "indicating disc." The indicating disc and this attached ratchet 41 are mounted for free rotation upon the arbor 30. The indicating disc is provided with a stop 44 adapted to engage a stop 45 on the casing (see Figure 3), and the indicating disc also has fixed to it one end of a coiled spring 46, the other end of which is fixed to the casing at 47, this spring serving to return the indicating disc to zero position with the stop 44 against the stop 45 after each actuation thereof. When the follower disc 32 is rotated by distance wheel 25 and spring 35, the pawl 40 simply rides over the successive teeth of the ratchet 41; thus the number of teeth which the pawl has passed over is determined by the distance which the vehicle has traveled.

When a fare is to be calculated means are provided whereby the operator may actuate the follower back from its position as determined by the stop on the distance wheel an amount proportional to the distance traveled by the particular passenger whose fare is to be calculated, and during this movement of the follower the pawl 40 positively engages one of the teeth of the ratchet 41 thereby rotating such ratchet and the indicating wheel in such a way as to indicate the exact fare to be collected. The particular means illustrated for actuating the follower disc and indicating wheel comprise a lever 50, provided with an operating handle 51, and mounted on the end of a short shaft 52. The latter carries a gear 53 meshing with a gear 54 which is fixed to a hub 55 rotatably mounted in the casing. In the specific structure illustrated the hub 55 is provided with a socket in which the end of the arbor 30 is mounted for free rotation. The arbor may, however, be supported in any other suitable manner. Means are provided, however, for establishing a driving connection between the hub 55 and arbor, the actual establishment of this driving connection depending upon the distance through which the follower disc and arbor have been rotated by the distance wheel at the time the operator actuates the handle 51. In the construction illustrated this driving connection is established by means of a stop pin 56 projecting from the arbor which is engaged at the proper time by a stop pin 57 projecting from the hub 55. Cooperating with the lever 50 is a scale 60, on the frame of the machine, comprising a series of numbers, corresponding with the numbers on the printing wheel 3 of the ticket issuing mechanism. These numbers represent the zones or units of distance from the start of the route within which passengers may have boarded the car. It will be understood that arbor 30 and pin 56 are turned counter clockwise (Fig. 3) when rotated from the driving wheel 25, while hub 55 and pin 57 are rotated clockwise by handle 51. When the distance wheel is in initial position pin 56 is so located with respect to pin 57, that handle 51 may be given its complete movement without pin 57 reaching and engaging pin 56. But if distance wheel and arbor 30 are rotated, say through a distance corresponding to one zone, and handle 51 is then given its complete movement, pin 56 will have moved into position such that it is engaged by pin 57 a distance of one unit before said handle reaches the end of its movement, and arbor 30 and dial 42 are rotated through one unit space. The numeral 3 is then indicated at the opening 61. As the vehicle travels through additional zones the distance wheel and the pin 56 so move that said pin approaches pin 57. It will be seen therefore, that when the vehicle is in any zone, and handle 51 is given its complete movement, dial 42 will be moved to show an indication corresponding to the complete number of zones travelled. Moreover if handle 51 is moved opposite any particular zone number, in place of being given its complete movement, the pin 56 and dial 42 will be moved to show at the window 61 an indication corresponding to the difference between the zone in which the vehicle is located and the zone indication to which the handle has been moved.

As pointed out above, each passenger when getting on the vehicle receives a ticket with a number on it determined by the distance which the vehicle has traveled from the starting point, and when the passenger is about to alight from the car he presents this ticket to the conductor, who reads the number on it and moves the handle 50 to a position on the scale 60 corresponding with that number. This actuation of the lever 50 through the mechanism described will automatically calculate the fare to be collected from the passenger presenting the ticket, and will cause the indicating disc to be rotated to such a point that the numeral thereon which is visible through the window 61 in the casing, indicates the exact fare which is to be collected.

The correct calculation of the fare follows from the fact that the operation of the indicating disc does not begin until the lever 50 has traversed a certain distance, depending upon the amount to which the distance wheel 25, follower 32, arbor 30 and stop pin 56 have been previously rotated by the action of the driving shaft 2, whereby the degree of rotation of these parts corresponds with the position of the vehicle at the time that the lever is actuated; while the indicating disc stops when the lever 50 has been turned to the proper numeral on the scale 60 as determined by the number on the ticket presented by the passenger, which number represents the position of the vehicle at the time the passenger got on. Thus the indicating disc actually moves a distance proportional to the difference between the positions of the vehicle at the time the passenger got off and at the time he got on, that is to say, proportional to the actual distance which he has traveled, and will always indicate a fare based upon such distance. In the particular example illustrated it is intended to collect a minimum fare of three cents, this fare being payable for the shortest ride which the passenger may take. The indicating disc accordingly bears the numeral 3 at the zero position thereon. For each succeeding unit of travel the passenger pays an additional cent so that the indicating wheel is graduated successively with the numbers 4, 5, 6 etc. Obviously this graduation may be varied to suit the particular circumstances of the case.

The lever 50 may conveniently be provided with a spring pointer 65 which cooperates with knobs 66 formed on the casing adjacent to the numerals of the scale 60. This pointer in snapping over the knobs assists the operator in stopping the lever directly opposite the numerals. A spring 67 is preferably provided for returning the lever 50 to its initial position as soon as released by the operator after each operation. A stop 68 limits the movement of the lever when returned by the spring, this initial position of the lever, as will be noted, being somewhat beyond the highest numeral on the scale. In other words, the lever in reaching the particular number desired is moved by the operator backward over the scale from the highest number thereon towards the lowest number. A bell 70 may be provided in such position as to be actuated by the striker 71 when the lever 50 is returned to its initial position by the spring 67. This serves as a check upon the operator so as to insure that he shall let the lever go all the way back after each operation thereof.

The mechanism so far described provides for the calculation and indication of the fare to be collected, but is preferable also to provide registering means to register the total of the fares calculated and indicated and presumably collected by the conductor so as to form a check upon him and insure that the full amount collected shall be accounted for. Such registering mechanism is provided in the construction shown and comprises a counter 80 which may be of any suitable or well known construction, and which will not, therefore, be illustrated in detail, and which is driven as follows:—Upon the shaft of the counter is a bevel gear 81 meshing with a bevel gear 82 on the short shaft 83 which carries a spur gear 84 meshing with a gear 85 which meshes with a gear 86 formed as a part of a sleeve 87 mounted for free rotation on the arbor 30. The sleeve 87 also carries the similar ratchets 88 and 89, one of which is mounted on each side of the gear 86. Cooperating with the ratchet 89 is a pawl 90 carried by the indicating disc 42 (see Figures 2 and 3), while cooperating with the ratchet 88 is a pawl 91 (see Figures 2, 4 and 6). The pawl 91 is fixed to a sleeve 92 which is journaled on a pin 93 carried by arm 94 projecting from the hub 55. The sleeve 92 has projecting from it a trigger 95 which carries a cam follower 96 adapted to cooperate with the internal cam 97, shown in Figure 4. The cam 97 is adjustably fixed to the wall of the casing by means of the slotted flange 98 and the clamping screws 99. The cam 97 has a portion of larger diameter 100 and a portion of smaller diameter 101 separated by a shoulder 102. When the cam follower is within the cam portion 100 the pawl 91 will be in engagement with the teeth on the ratchet 88. When, however, the hub 55 is rotated through the actuation of the lever 50 so that the arm 94 and the trigger, cam follower and pawl carried thereby are rotated to such an extent that the cam follower passes over the shoulder 102, then the sleeve 92 is rocked so as to lift the pawl 91 out of engagement with the teeth on the ratchet 88 and the pawl remains in this inoperative position so long as the cam follower remains in engagement with the cam portion 101.

As has already been noted, the lever 50 normally occupies an initial position somewhat beyond the highest numeral on the scale 60, as shown in Figure 1. The cam 97 is so placed that during the movement of the lever 50 from its point of initial position up to the highest numeral on the scale 60 (in this case numeral 8), the cam follower 96 is traveling along the cam portion 100, and at or before the time when the lever 50 reaches the highest numeral on the scale the cam follower passes the shoulder 102 and moves into engagement with the cam portion 101, thus throwing the pawl 91 out of engagement with the teeth of the ratchet 88, the pawl being held in this inoperative position during the remainder of the travel of the lever 50. The cam 97 is so adjusted that when the lever 50 is returned to its initial position after the operation, the cam follower 96 shall pass off the shoulder 102 so as to permit the pawl 91 to come into engagement with the ratchet 88 just in time to permit the pawl to snap over a number of teeth equal to the number of units in the minimum fare to be charged. Thus, in the present instance, when the minimum fare is three cents, the pawl 91 will pass over three teeth. Upon the next actuation of the lever 50, the pawl 91 will therefore advance the ratchet 88 a distance of three teeth before the cam follower reaches the shoulder 102 and throws the pawl 91 out of operative engagement with the ratchet. The pawl 91 and ratchet 88 and associated parts thus provide a means for advancing the register 80 a number of units corresponding with the minimum fare which must be collected every time the mechanism is operated. In addition to this minimum fare the register must also register the additional fare collected, depending upon the distance traveled by the passenger, and this is accounted for by the ratchet 89 and pawl 90. It will be seen that the pawl 90 being carried by the indicating wheel 42, the movement of which corresponds exactly with the distance which the passenger actually travels, and for which he pays fare, will advance the ratchet wheel 89 a distance proportional to this distance traveled so that the register 80 will be moved accordingly. Thus the register is seen to have two cumulative movements for each operation of the lever 50, the first one being produced by the action of the pawl 91 upon the ratchet 88 which registers the minimum fare of three cents or whatever it may be, while the second movement, caused by the action of the pawl 90 upon the ratchet 89, is proportional to the distance traveled and therefore to the fare in excess of three cents which is collected. These two movements combined cause the register to be advanced each time the apparatus is actuated by just the amount of the fare collected, so that this register shows at all times the total of fares collected.

In order to provide a convenient check on the conductor and make sure that no passenger is permitted to leave the car without paying a fare, two counters are preferably provided, one driven by the ticket-issuing mechanism and showing the total number of operations thereof, and the other driven by the calculating and indicating mechanism to indicate the total number of operations thereof. At the end of a run these two counters should agree. If they do not it shows that some passenger has failed to pay a fare or that there is some irregularity on the part of the operator. As illustrated, a counter 110 is provided to indicate the number of operations of the ticket-issuing mechanism, this counter being driven from the crank 18 by suitable transmission devices 111. A second counter 112 is driven by means of a suitable trip device 113 engaged by a stop on the lever 50 so that every time this lever is operated the counter 112 is advanced one number. As illustrated in Figure 13, the trip lever 113 may be intermediately pivoted at 114 to a suitable bracket 119 on the casing 1, and have its inner end connected by a link 115 to a rock arm 116 pivoted concentrically of the counter 112 and carrying a spring-pressed pawl 117 to engage the ratchet 118 of said counter. A similar counter actuating means may be employed in connection with the lever 18 for actuating the counter 110. When all passengers have left the vehicle the indications of the counters 110 and 112 should agree showing that a collection has been made for every ticket issued.

In Figures 7 and 8 we have shown a modification of the apparatus in which means are provided for printing on a tape the amount indicated at each operation of the device, so that a complete record of the separate sums collected is preserved. An additional check is thus formed upon the operator, and data is obtained which may be of great utility under some circumstances. For instance, the exact proportion of passengers taking longer or shorter rides may be ascertained for statistical purposes. The mechanism of the instrument shown in these figures is identical with that previously described except that the indicator disc 42 has attached to it a printing disc 120 which has types 121 on its periphery adapted to print on a tape 122. The latter is adapted to be fed step by step from the reel 123 to the reel 124 by the action of the crank 125 which also actuates suitable mechanism contained within the casing 126 for pressing the tape against the type. The tape-feeding and printing devices are not illustrated in detail as any suitable devices of this character, many of which are well known, may be employed such for instance as those disclosed in United States Patents Nos. 428,002 issued May 13, 1890, to William Koch, and 502,317 issued Aug. 1, 1893, to John Pfeifer. The devices disclosed in these patents may also be used in the casing 16, Figures 2 and 3, for feeding and printing the tape 15. When a passenger is to pay his fare he hands his ticket to the operator who moves the lever 50 to the proper numeral on the scale 60 corresponding with the number on the ticket, as in the apparatus previously described. While the lever 50 is held in this position the operator turns the crank 125, which prints a number on the tape corresponding with the number visible through the window 61, the revolution of the crank also advancing the tape after printing, ready for a new impression on the next operation of the lever 50.

The apparatus may be actuated in any suitable manner to maintain it in a condition corresponding with the variations in the variable factor to be provided for. The control of the actuating mechanism depends upon what the variable factor is and the control devices may be operated by mechanism of any desired character or at proper intervals by hand or otherwise, as the case may be. If the present device is to be utilized as a fare calculator and register, it is preferably driven automatically in accordance with the movements of the vehicle. This may be accomplished in various ways.

In Figure 9, for instance, the indicator is shown as mounted in a street car and driven from one of the axles thereof, preferably an axle which is not positively connected with the propelling motor of the vehicle and with which the brake is not connected, if there be such an idle axle. In the particular construction which is illustrated merely diagrammatically, the shaft 2 of the instrument extends downwardly and is connected by suitable gearing to a rotatable shaft 131 carried by supporting means 130.

The shaft 131 carries a bevel gear 132 which meshes with the bevel gear 133 on the axle 134. In Figure 10 a modified construction is illustrated in which a special trailer wheel 140 is provided which is carried on a swinging arm 141 and normally held in close contact with the rail or road surface by a spring 142. The wheel 140 may be provided with a tread of rubber or other suitable material which will not slip on the track or road surface. Power may be transmitted from the wheel 140 to the instrument by means of a flexible shaft 143, or otherwise.

In Figures 11 and 12 another construction is shown, diagrammatically, in which a series of tripping blocks 150 are provided at suitable points along the route of the vehicle. Every time the vehicle passes one of these points which correspond to the units of travel for which an additional fare is to be charged, the tripping block is engaged by a follower 151 on a plunger 152 which is mounted to slide up and down in guides 153. The plunger 152 carries a pawl 154 which engages the teeth of a ratchet 155, which may be arranged to drive the mechanism of the instrument in any suitable manner. For instance, it may be mounted directly upon the stem 26 of the distance wheel 25, the number of teeth of the ratchet corresponding with the number of teeth on the ratchet 41. Every time a trip block is passed, therefore, the mechanism will be advanced the distance of one tooth.

It is believed that the operation of the apparatus is now apparent. Considering the example of the invention described in which the invention is applied to a fare calculator and register for vehicles, passengers may get on the vehicle at any point, each passenger receiving a ticket when he gets on which will be properly numbered by the mechanism described or otherwise, so as to indicate the point at which his journey starts. Whenever a passenger gets off he hands his ticket to the conductor who operates the lever 50 to that number on the scale 60 corresponding with the number on the passenger's ticket. This automatically causes the fare to be paid by the passenger to be indicated at the window 61, where the proper numeral may be seen by both the conductor and the passenger. The operation of the lever 50 also actuates the register 80 to register the amount of fare so that a complete check on the amount of money taken in by the conductor is provided. The conductor collects the amount indicated, from the passenger, and permits the lever 50 to be returned to its initial position by the spring 67. The apparatus is then in condition to be instantly operated when the next passenger gets off. All that the conductor has to do is to push the lever over to the number designated in the ticket and collect the amount indicated so that the collection of fares may be carried on with accuracy and dispatch. Delays are thus avoided and a large number of passengers may be handled in a very short time.

While we have shown and described in detail one preferred form of mechanism and one application of the invention, it will be understood that the invention may be applied in a multitude of ways and we do not, therefore, intend to limit ourselves to the specific construction set forth, but intend to cover our invention broadly in whatever form its principle may be employed.

Having thus described our invention, we claim:—

1. In a fare calculator for calculating a fare dependent on distance travelled by a vehicle, the combination with means automatically moved an amount proportional to the total distance travelled by the vehicle, of manual means adapted to be moved to positions corresponding to previous locations of the vehicle.

2. In a fare calculating machine for vehicles, the combination with a ticket marking apparatus to be automatically set during the movement of the vehicle according to the position thereof on its route, of means for manually actuating said marking apparatus to indicate on a ticket the point on the route at which a passenger boarded the vehicle, fare indicating means carried by the machine operating means therefor adapted to be automatically set during the movement of the vehicle according to the position thereof on its route, and means for manually actuating said fare indicating operating means at the point the passenger leaves the vehicle according to the marking on the ticket showing the point at which he boarded the vehicle, whereby his correct fare will be shown on said fare indicating means of the machine.

3. In a fare calculator adapted to calculate a fare proportional to the distance travelled by a vehicle, the combination with means automatically moved by the travel of said vehicle, of manual means adapted to be moved to positions corresponding to previous locations of said vehicle, a fare indicating dial, adapted to be actuated by said manual means, and driving connections intermediate said manual means and said dial adapted to be set by said automatic means.

4. In a machine adapted to calculate fares in accordance with distance travelled by a vehicle, an element adapted to be moved an amount proportional to the total distance travelled by the vehicle, a second element adapted to be moved to a location representing a previous distance travelled by the vehicle, a fare indicating dial and means whereby the movement of said second element actuates said dial an amount proportional to the difference between said total distance and said previous distance.

5. In a fare calculator, a movable element driven in accordance with the movements of the vehicle, a second movable element adapted to be actuated by the operator to a degree corresponding with the distance traveled by the vehicle at the time a passenger boarded the same, means controlled by said movable elements for calculating a fare proportional to the difference between the distances traveled by the vehicle at the time the passenger boarded the same and at the time of the actuation of the apparatus and an adjustable fare indicator carried by said calculator for showing the calculated fare.

6. In a fare calculator for vehicles, the combination of power driven means for changing the condition of the apparatus in accordance with the distance travelled by the vehicle, means to be actuated by the operator for changing the condition of the apparatus in accordance with the distance travelled by a passenger carried by the vehicle, means operably associated with both said condition changing means for determining the fare to be paid by the passenger and an adjustable fare indicator carried by said calculator for showing the calculated fare.

7. In a fare calculator for vehicles travelling over a predetermined route, power priven means normally movable in accordance with the travel of the vehicle, manually operated means for moving said movable means an amount proportionate to the distance travelled by a passenger riding on the vehicle, and means adapted to be actuated by said movable means when moved in proportion to the distance travelled by the passenger for determining the fare to be paid by the passenger.

8. In a fare calculating machine for vehicles travelling over a predetermined route, means normally operable in accordance with the distance travelled by the vehicle yet operable in accordance with the distance travelled by a particular passenger riding on the vehicle for calculating and displaying the fare to be paid by said passenger.

9. In a fare calculator adapted to calculate fares in accordance with the movement of a vehicle, a shaft, means for moving said shaft in accordance with the travel of a vehicle, manual means adapted to be positioned to represent the location in which a passenger boards the vehicle, instrumentalities whereby the positioning of said manual means rotates said shaft an amount proportional to the distance travelled by the passenger, fare indicating means, and driving means for said fare indicating means associated with said shaft.

10. In a fare calculator adapted to calculate the fare due from a passenger in accordance with the distance travelled by the passenger, a shaft, means for advancing said shaft an amount proportional to the travel of the vehicle, a manual device adapted to be moved to a position representing the location at which a passenger boarded the vehicle, connections intermediate said manual device and said shaft whereby said movement of the manual device returns said shaft through an amount proportional to the distance travelled by the passenger, and fare registering means adapted to be actuated by said return movement of said shaft.

11. In a zone fare registering device, a fare register controlling shaft, means for rotating said shaft an amount proportional to the travel of the vehicle, a zone indicating dial, a device adapted to be moved to one of a plurality of positions on said dial representing zones through which the vehicle travels, and connections whereby the movement of said device rotates said shaft through an amount proportional to the distance travelled by the vehicle since the vehicle left the zone represented by the designation to which the device is moved.

12. In apparatus of the character described, an indicator, power driven means actuated in accordance with the travel of the vehicle but ineffective when so actuated to move said indicator, and manually actuated means for variably positioning said indicator in accordance with the position of said power driven means.

13. In a fare calculator, in combination, a movable indicating member, manually controlled means for moving said member, and means automatically actuated during the movement of the vehicle to which the calculator is attached for modifying the extent to which said manually controlled means will move said indicating member.

14. In a fare calulator, in combination, an indicating member, manual actuating means, transmitting means whereby movement is transmitted from said manual actuating means to said indicating member, and means movable in accordance with the travel of the vehicle to which the calculator is attached for changing the condition of said transmitting means so as to modify the extent to which movement is transmitted to said indicating means when said manual means is actuated.

15. In apparatus of the character described a power driven member, a follower adapted to be driven by said driven member in one direction, but capable of movement independent of said driven member in the other direction, a fare indicating member having ratchet connection with said follower, and means for actuating said follower in the direction away from said driven member for determining the amount of the fare.

16. In apparatus of the character described, a driven member, a follower adapted to be driven by said member in one direction, but capable of independent movement with respect to said member in the other direction, a fare indicating member having ratchet connection with said follower, an operating handle, and a lost motion operative connection between said handle and said follower, whereby said handle may be actuated to operate said follower and indicating member, the amount of lost motion being varied by the extent to which said driven member and follower have traveled up to the time said operating handle is actuated.

17. In apparatus of the character described, a driven member, a follower adapted to be driven by said member in one direction, but capable of independent movement with respect to said member in the other direction, a yielding connection between said follower and driven member, a fare indicating disc having numerals thereon and having a ratchet attached thereto, a pawl carried by said follower and adapted to pass idly over the teeth of said ratchet when said follower is traveling with said driven member, but to engage said teeth so as to move the indicating member with the follower when the follower is moved away from said driven member, an actuating handle, and a lost motion operative connection between said operating handle and said follower.

18. In apparatus of the character described a fare indicating disc, a pawl carried thereby, a ratchet adapted to be actuated by said pawl, an operating handle, a lost motion connection between said operating handle and said indicating disc, a pawl operated by said handle, a second ratchet operated by said pawl, and connections between each of said ratchets and a total counter.

19. In apparatus of the character described a fare indicating disc, a pawl carried thereby, a ratchet adapted to be actuated by said pawl, an operating handle, a lost motion connection between said operating handle and said indicating disc, a pawl operated by said handle, a second ratchet operated by said pawl, connections between each of said ratchets and a total counter, and means for throwing one of said pawls out of operation before the other pawl begins its operation.

20. In a fare calculator, in combination, a register, an operating handle, means actuated by an initial movement of said operating handle whereby said register is actuated a fixed amount, means for disabling said actuating means at the end of said initial movement of said operating handle, and other means whereby subsequent movements of said handle actuate said register through variable amounts.

21. In a device of the character described, in combination, a register, an operating handle, primary means whereby an initial movement of said handle actuates said register an invariable amount, means for disabling said primary actuating means at the end of said initial movement, and secondary actuating means including a variably positioned element whereby equal movements of said handle subsequent to said initial movement operate said register through varying amounts.

22. In a device of the character described, in combination, a register, an operating handle, primary means whereby an initial movement of said handle actuates said register an invariable amount, means for disabling said primary actuating means at the end of said initial movement, and secondary actuating means including a variably positioned element, and a device actuated by said handle and cooperating with said variably positioned element whereby equal movements of said handle subsequent to said initial movement actuate said register through varying amounts.

23. In a vehicle fare registering device, in combination, a register, an operating handle, primary actuating means for said register whereby an initial movement of said handle actuates said register an invariable amount, means for disabling said primary actuating means at the end of said initial movement, secondary actuating means for said register including an element which is variably positioned by the movement of the vehicle, and means actuated by said operating handle for moving said variably movable element.

WILLIAM P. HAMMOND.
EDMUND QUINCY MOSES.